Aug. 6, 1935.    W. P. SIMPSON    2,010,610
CODING APPARATUS
Filed March 1, 1933
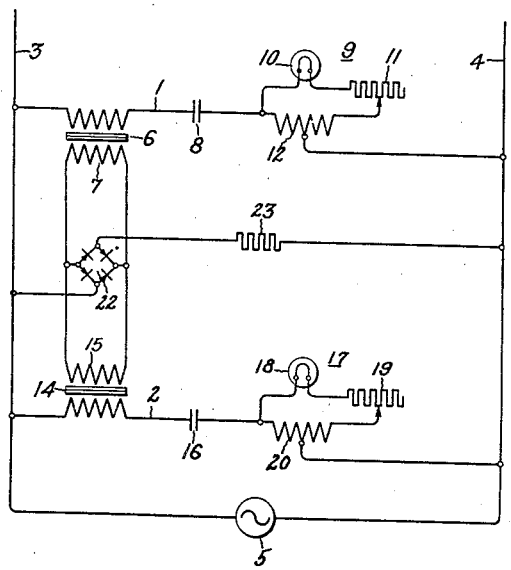
Inventor:
Waldo P. Simpson,
by Charles E. Tuller
His Attorney.

Patented Aug. 6, 1935

2,010,610

UNITED STATES PATENT OFFICE 2,010,610

CODING APPARATUS

Waldo P. Simpson, Schenectady, N. Y., assignor to General Electric Company, a corporation of New York Application March 1, 1933, Serial No. 659,195

5 Claims. (Cl. 177—346)

My invention relates to apparatus for producing impulses or signals automatically in accordance with a predetermined code and it has for its object the provision of improved apparatus of this character whose construction is simple and inexpensive and whose functioning does not depend upon the operation of relatively moving parts.

In the single figure of the drawing which is a circuit diagram illustrating one embodiment of my invention I have shown two similar alternating current nonlinear resonant pulsation circuits 1 and 2 which are arranged to be connected through the leads 3 and 4 with a source of supply of alternating current represented at 5 which source may, for example, be a 110 volt, 60 cycle commercial lighting source. Circuit 1 includes the saturable core reactor 6 having the saturating winding 7, the capacitor 8, and a load impedance represented generally by reference number 9. This load impedance in the present case is represented as comprising the electric lamp 10 and the rheostat 11 which are supplied from the secondary circuit of the step-up auto-transformer 12 included in the circuit. The other nonlinear resonant circuit 2 includes the saturable core reactor 14 which may be identical with reactor 6 and which has the saturating winding 15, the capacitor 16, which may be identical with capacitor 8, and a load impedance represented generally by reference number 17. This load impedance like that at 9 is represented in the present case as including the electric lamp 18 and the rheostat 19 which are supplied from the secondary circuit of the step-up auto-transformer 20 included in the circuit. While the load impedances 9 and 17 are similar in construction they have quite different impedance values as will be explained later. The saturating windings 7 and 15 are supplied in common from any suitable source of direct or rectified current. In the present case these windings are shown as supplied in parallel from the single full wave rectifier 22 which has its input side connected through the resistor 23 with the source of alternating current supply 5. Each of the two pulsation circuits 1 and 2 is of the character disclosed and claimed in the Suits Patent 1,921,787 August 8, 1933 where the pulsations or variations in the effective value of the alternating current flowing in the circuit are represented for example by the curve 13 of Fig. 2.

If the two load impedances 9 and 17 are equal, the pulsation frequency of the two circuits 1 and 2 will be equal and the pulsation periods will alternate in the two circuits. The reason for this alternate pulsation lies in the fact that the two reactors 6 and 14 are supplied with saturating current from the common source 22. The transient set up in the saturating winding of one reactor, causing it to pulsate, opposes any transient which might be set up in the saturating winding of the other reactor by any tendency of the other circuit to pulsate at the same time. This coupling of the two saturating circuits and the above-described action results in the two circuits pulsating at alternate intervals. The frequency of the pulsations in each of the circuits 1 and 2, other conditions being equal, depends upon the impedance value of the loads of the two circuits. In carrying out my invention I make the load impedance of one circuit materially different from that of the other circuit whereby the frequency of pulsation in the one circuit is exactly or approximately a multiple of that of the other circuit. A difference in load impedance may be produced in various ways. In the form illustrated, lamps 10 and 18 may be employed having different resistances, rheostats 11 and 19 being omitted or equal; equal resistance lamps may be employed and the setting of rheostats 11 and 19 may be different; or both the lamp and the rheostat in one circuit may be different from the corresponding elements in the other circuit. The following table illustrates various combinations of lamps and rheostats with the resulting pulsation or flash ratios of the two circuits:

| Lamp 10 | | Rheostat 11 | Lamp 18 | | Rheostat 19 | Pulsation or flash ratio | |
|---|---|---|---|---|---|---|---|
| | | | | | | Circuit 1 | Circuit 2 |
| W. | V. | Ohms | W. | V. | Ohms | | |
| 100 | 125 | 0 | 100 | 125 | 0 | 1:1 | |
| 100 | 125 | 45 | 50 | 125 | 0 | 1:2 | |
| 100 | 125 | 0 | 50 | 125 | 0 | 1:3 | |
| 100 | 125 | 0 | 50 | 125 | 72 | 1:4 | |
| 100 | 125 | 0 | 50 | 125 | 230 | 1:5 | |

From the above chart it will be seen that if both lamps 10 and 18 are 100 watts, 125 volt lamps, and the rheostats 11 and 19 have zero ohms resistance, the flash ratio will be 1:1, the pulsations or flashes in the two lamps having the same frequency. By reason of the coupling of the two reactors through their saturating windings and the rectifier 22, the pulsations or flashes of the lamps will occur alternately. If lamp 10 is a 100 watt, 125 volt lamp, the rheostat 11 is 45 ohms, lamp 18 is a 50 watt, 125 volt lamp, and rheostat 19 is zero ohms, the pulsation or flash ratio will be 1:2; that is, for each pulsation or flash in circuit 1 there will be two pulsations or flashes in circuit 2, and each pulsation of circuit 1 will alternate with each two successive pulsations or flashes of circuit 2. As shown by the chart various other pulsation or flash ratios may be obtained by making the load resistances of the two circuits of proper relative values such as those indicated.

If lamps 10 and 18 were readily procurable in a sufficiently wide variety of voltages one might dispense entirely with the auto-transformers 12 and 20 but where standard lamps are to be employed for obtaining various different flash ratios I have found it convenient to employ auto-transformers whereby compensation may be made for the voltage drop in the non-linear circuit and in the rheostat employed with each lamp. While I have shown the load impedances as including electric lamps, it will be understood that various other load devices may be employed in the two circuits provided their impedances are properly related to cause the pulsation frequency of one circuit to be an exact or approximate multiple of that of the other circuit. I have found that the above-described arrangement is insensitive to voltage changes of from 10% for the 1:5 ratio arrangement to 30% for the 1:1 ratio. The apparatus being entirely independent for its operation upon any relatively moving parts it is useful in various applications as a simple non-mechanical code flasher; moreover, being independent of the type of load it is not limited to a lamp load. In the event that difficulty is experienced in distinguishing between the two lamps at a distance one might employ lamps of different intensities or color in the two circuits.

In the drawing I have shown the reactors 6 and 14 in a diagrammatic manner. These reactors may in actual construction be made like those represented in Fig. 1 of my Patent No. 1,885,155 of November 1, 1932, or may comprise a pair of transformers connected in the manner shown by Fig. 2 of the aforesaid patent.

I have chosen the particular embodiment described above as illustrative of my invention and it will be apparent that various other modifications may be made without departing from the spirit and scope of my invention which modifications I aim to cover by the appended claims.

What I claim as new and desire to secure by Letters Patent of the United States, is:

1. In combination, a plurality of circuits arranged for connection with a source of alternating current supply, said circuits including loads having different impedances, means including a saturable core reactor in each of said circuits arranged to cooperate with the load therein for causing the alternating current in the circuits to pulsate, said reactors having saturating windings and common means for supplying current thereto, the pulsations in one circuit being a multiple of those of the other and the multiple number of successive pulsations of the one circuit occurring alternately with single successive pulsations of the other.

2. In combination, a plurality of circuits arranged for connection with a source of alternating current supply, said circuits including loads having different impedances, means in each of said circuits arranged to cooperate with the load therein for causing the alternating current in the circuits to pulsate, said means including a saturable core reactor having a saturating winding, a rectifier arranged to be connected with said source for supplying saturating current to both of said windings, the pulsation frequency in one of said circuits being a multiple of that in the other and the multiple number of successive pulsations in the one circuit occurring alternately with single successive pulsations of the other.

3. Code flashing apparatus including means comprising a plurality of alternating current non-linear resonant pulsation circuits arranged for connection with a source of alternating current supply and each including a saturable core reactor having a saturating winding, said circuits comprising loads having different resistances and each including a lamp, a rectifier connected to both of said saturating windings and arranged for connection with said source of supply, whereby the flashes from one lamp are a multiple of those from the other and the multiple flashes of the one lamp occur alternately with respect to the single flashes of the other.

4. In combination, a plurality of circuits arranged for connection with a source of alternating current, each circuit including a saturable core reactor and means cooperating therewith for causing the alternating current in the circuit to pulsate, the constants of the circuits being so related that the pulsation frequency in one circuit is substantially a multiple of that of the other, means for saturating each of said reactors and means connecting together said saturating means whereby the pulsations in one circuit occur alternately with a plurality of successive pulsations of the other circuit.

5. Code flashing apparatus comprising an alternating current supply circuit, a plurality of non-linear resonant pulsation circuits each including a lamp connected to be energized from said supply circuit, the pulsation frequency of one of said pulsation circuits being a multiple of that of the other and means interconnecting said pulsation circuits for controlling the relation of the pulsations therein whereby the flashes of the lamp in one pulsation circuit alternate with multiple flashes of the lamp in the other pulsation circuit.

WALDO P. SIMPSON.